US008874705B1

(12) United States Patent
Satish

(10) Patent No.: US 8,874,705 B1
(45) Date of Patent: Oct. 28, 2014

(54) METHOD AND APPARATUS FOR IDENTIFYING AN OPTIMAL CONFIGURATION OF A RESOURCE

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1102 days.

(21) Appl. No.: 12/044,361

(22) Filed: Mar. 7, 2008

(51) Int. Cl.
*G06F 13/00* (2006.01)

(52) U.S. Cl.
USPC ............ 709/221; 709/220; 709/224; 709/223

(58) Field of Classification Search
USPC ............... 709/224, 223, 202, 220–222; 707/7
See application file for complete search history.

(56) References Cited

U.S. PATENT DOCUMENTS

| | | | |
|---|---|---|---|
| 6,738,811 B1 * | 5/2004 | Liang | 709/224 |
| 7,216,169 B2 * | 5/2007 | Clinton et al. | 709/224 |
| 2003/0041138 A1 * | 2/2003 | Kampe et al. | 709/223 |
| 2005/0021733 A1 * | 1/2005 | Clinton et al. | 709/224 |
| 2007/0008890 A1 * | 1/2007 | Tseitlin et al. | 370/238 |
| 2009/0228519 A1 * | 9/2009 | Purcell et al. | 707/104.1 |
| 2012/0166623 A1 * | 6/2012 | Suit | 709/224 |
| 2012/0166624 A1 * | 6/2012 | Suit | 709/224 |
| 2012/0166625 A1 * | 6/2012 | Suit | 709/224 |

* cited by examiner

*Primary Examiner* — Kenneth Coulter
(74) *Attorney, Agent, or Firm* — Wilmer Cutler Pickering Hale and Dorr LLP

(57) ABSTRACT

A method and apparatus for identifying an optimal configuration of a resource is described. In one embodiment, the method for using a health scoring technique to improve a health of the computer comprises processing profile information and a health score associated with the computer having a resource, wherein the profile information indicates installed software and hardware configuration, wherein the health score represents a health of the computer and identifying an optimal configuration of the resource based on profile information and the health score.

18 Claims, 3 Drawing Sheets

METHOD AND APPARATUS FOR IDENTIFYING AN OPTIMAL CONFIGURATION OF A RESOURCE

BACKGROUND OF THE INVENTION

1. Field of the Invention

Embodiments of the present invention generally relate to resource configuration management systems and, more particularly, to a method and apparatus for identifying an optimal configuration of a resource to improve a health of a computer using a health scoring technique.

2. Description of the Related Art

A variety of issues must be addressed to facilitate the execution of large and small scale software applications within any computing environment (e.g., a plurality of computing devices coupled to a server and/or a communication network). Some of the issues involve the configuration and/or utilization of various resources (e.g., software applications and hardware devices such as, networking components, server clusters (e.g., ORACLE server clusters, high availability server cluster and the like), storage devices, graphics cards, display devices, memory, processors and the like) associated with the computing environment.

Each resource within the computing environment is associated with several configuration parameters. Such configuration parameters describe the resource in terms of capacity, efficiency, density, bandwidth, throughput, organization and/or speed. For example, a storage device may be described as a hard disk drive with a capacity of fifty gigabytes, a media transfer rate of one gigabit per second and a rotation rate of five thousand revolutions per minute (rpm). As another example, the hard disk drive may form a portion of a Redundant Array of Independent Disks (RAID) configuration. As yet another example, the hard disk drive may be an enterprise storage device coupled to the computing environment through a Fibre Channel interface. The storage parameters need to be optimized to enable the system to operate in a healthy manner resulting in an improved system performance.

Often, the vender of a software package publishes recommendations or suggestions concerning ideal configurations of the various resources. For example, the software package may be accompanied with recommended resource requirements (e.g., an amount of available data storage space, a capacity of random access memory (RAM), a minimum processor speed, a network bandwidth capacity and the like). Such recommendations, however, are limited because the recommended configurations are ideal for the operations of the particular software package but not for the computing device as a whole. In other words, the recommended configurations do not account for the resource demands/requirements of other software packages currently installed on the computing device.

Furthermore, the recommended configurations are not optimal for a plurality of software applications in operation at or around the same time at the computing device. As a result, the plurality of software applications may drain any available resources, inhibit the utilization of the available resources by a critical software application (e.g., SYMANTEC NORTON anti-virus) and/or cause a significant drop in the performance of the computing device or system as a whole. Hence, the recommended configurations are limited because such configurations cannot be applied to achieve optimal performance and stability of the entire computing device.

Occasionally, system administrators manage configurations of the various resources of one or more client computers within a system (e.g., a server cluster). The system administrators desire to implement optimal configurations of the various resources for each client computer. However, this is a cumbersome task due to the amount of trial and error involved in testing different configurations to determine the most optimal or ideal configuration for the various resources. The system administrators must still experiment with several configurations before finding the configuration that is optimal or ideal for the entire computing device and not simply one software application. For example, the installation of one or more additional software packages often strains the available resources and may impact the health of the computing device. Hence, there is incredible difficulty in identifying ideal or optimal configurations of the various resources after the installation of additional software packages.

Therefore, there is a need in the art for a method and apparatus for identifying an optimal configuration of a resource to improve a health of a computer using a health scoring technique.

SUMMARY OF THE INVENTION

Embodiments of the present invention generally comprise a method and apparatus for using a health scoring technique to improve a health of a computer. In one embodiment, a method of using the health scoring technique to improve the health of the computer having a resource comprises processing profile information and a health score associated with the computer, wherein the profile information indicates an installed software application and a hardware configuration, wherein a health score represents a health of the computer and identifying the optimal configuration of the resource based on the profile information and the health score.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
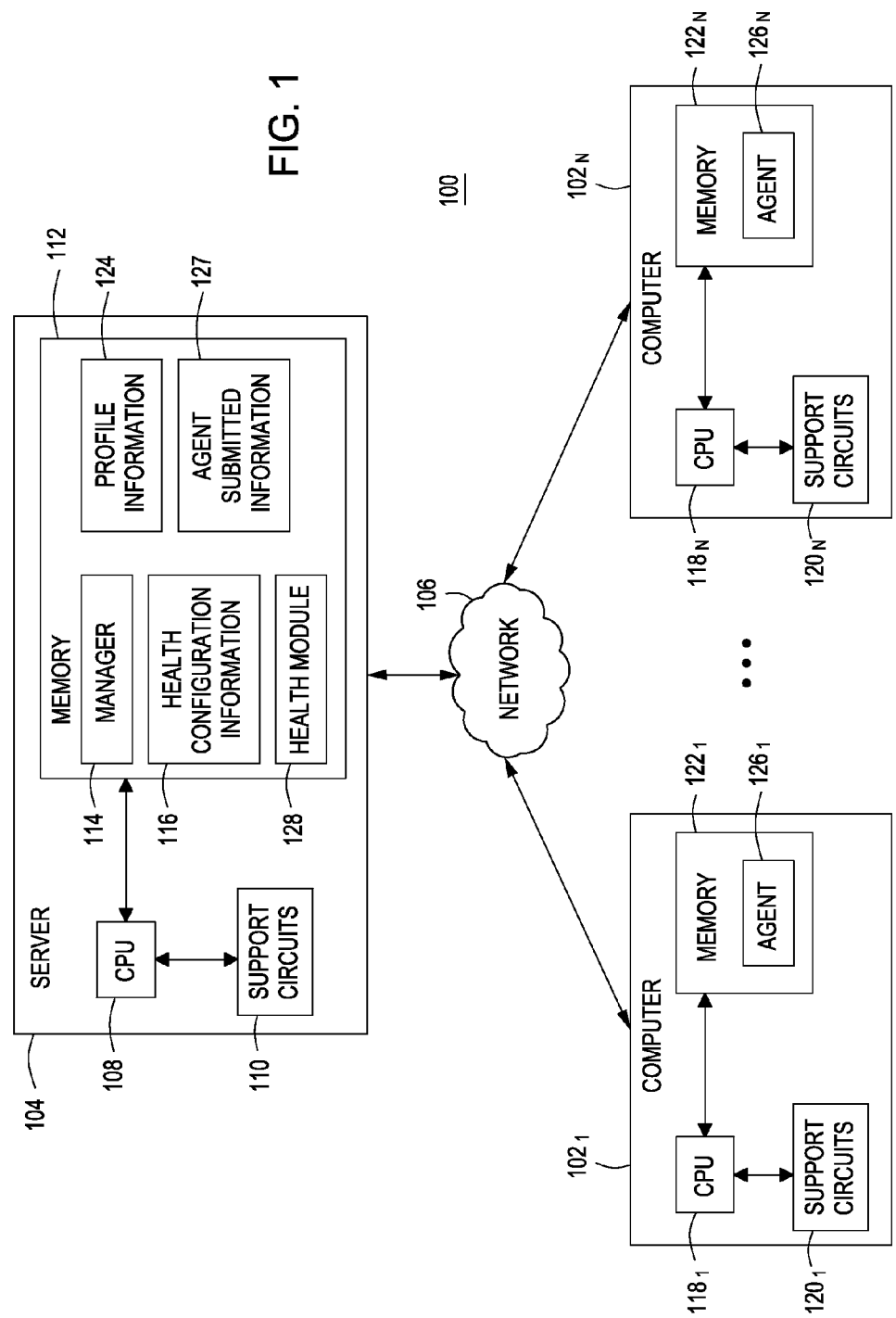
FIG. 1 depicts a block diagram of a system for identifying an optimal configuration of a resource, according to an embodiment of the present invention.

FIG. 1 depicts a system 100 for identifying an optimal configuration of a resource, according to an embodiment of the present invention. The system 100 comprises a plurality of computers 102 (illustrated as computer $102_1$ . . . computer $102_n$), a server 104, each coupled to one another through a network 106. It is appreciated that a computer $102_i$ will be used in the following description of FIG. 1 to refer to any one computer of the plurality of computers 102.

The computer $102_i$ comprises a Central Processing Unit (CPU) 118 various support circuits 120 and a memory 122. The CPU 118 may comprise one or more commercially available microprocessors or microcontrollers that facilitate data processing and storage. The various support circuits 120 facilitate operation of the CPU 118 and may include clock circuits, power supplies, input/output circuits and/or the like. The memory 122 includes a read only memory, random access memory, disk drive storage, optical storage, magnetic storage, removable storage, and the like. The memory 122 includes various software packages, such as an agent 126.

The server 104 comprises a Central Processing Unit (CPU) 108, various support circuits 110 and a memory 112. The CPU 108 may comprise one or more commercially available microprocessors or microcontrollers that facilitate data processing and storage. The various support circuits 110 facilitate operation of the CPU 108 and may include clock circuits, power supplies, input/output circuits and/or the like. The memory 112 includes a read only memory, random access memory, disk drive storage, optical storage, magnetic storage, removable storage, and the like. The memory 112 includes various software packages, such as a manager 114 and a health module 128. The memory 112 further includes various data, such as healthy configuration information 116, profile information 124 and agent submitted information 127.

The network 106 comprises a communication system that connects a computer system by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like.

Generally, the health module 128 evaluates several factors (e.g., performance and stability factors) regarding various system and computing resources which influence computer health and productivity. The health module 128 monitors levels, peaks and degree of variations of such performance and stability factors in order to determine an overall system health of the computer $102_i$. In another embodiment, the profile information 124 describes the operating system, service packs/updates, operating system settings and configuration, installed software applications, installed/present hardware devices as well as the hardware configurations and the like. The health module 128 examines the agent submitted information 127 and/or the profile information 124 in order to compute a system health score.

Furthermore, the health module 128 employs a computer health metric to determine distances or differences between two or more health scores. In general, the computer health metric is a standard by which the system health of the computer 102 is measured. Accordingly, such differences are indicators of the impact on the health of the computer $102_i$ related to hardware and/or software configuration differences. As explained further below, the manager 114 of the server 104 evaluates such differences between the one or more system health scores to determine the impact, if any, on the system health of the computer $102_i$ associated with such differences.

Generally, the system health of a computer is defined by various stability and performance measurements. As explained further below, the agent 126 gathers the various stability and performance measurements, which are communicated to the health module 128 to compute system health scores. For example, stability measurements include frequencies of system and application crashes, device or service failures, driver failures, logged application or device errors and the like. As another example, performance measurements include computer boot time, time from system start to user logon query, time from logon query to desktop display, application start/run times, time to complete file reads/writes of data blocks, Input/Output level bottleneck statistics, average system/application CPU utilization, average system/application network I/O utilization, memory utilization, hard and soft page fault rate, paged and non-paged pool peaks and peek hit rate, CPU interrupt rate and the like.

Accordingly, the system health score may be computed as a sum of all the averages of various performance and stability measurements taken at various iterations in the operation of the computer $102_i$. The system health score is a moving average influenced by changes to the software configuration and/or hardware configuration changes (e.g., installation, operation and/or removal of software applications and/or hardware devices). For example, the system health score reflects an amount of available data storage space in a memory, processing power, an Input/Output (I/O) data transfer rate, a network bandwidth capacity and the like.

In operation, the agent 126 processes (e.g., gathers) information regarding performance and stability factors as well as utilizations and configurations of various resources (e.g., software applications, hardware devices and the like) at the computer 102. The agent 126 communicates the processed information to the server 104 to be stored as the agent submitted information 127. In one embodiment, the agent 126 generates the profile information 124 for the plurality of computers 102 using a portion of the processed information. The profile information 124 indicates one or more installed software applications and any associated components as well as configurations of the various resources (e.g., hardware) associated with the computer $102_i$. In one embodiment, the profile information 124 is a software profile comprising software configurations at the computer $102_i$. In another embodiment, the profile information 124 is a hardware profile comprising hardware configurations at the computer $102_i$. Furthermore, the profile information 124 is updated by the agent 126 to include subsequent modifications to the configurations of the various resources as well any additional or removed resource. The health module 128 computes system health scores based on the processed information collected by the agent 126 (e.g., performance and stability factors). The manager 114 processes the profile information 124 and the system health scores from the plurality of computers 102 to identify one or more optimal or ideal system configurations (e.g., hardware configurations) for a computer having one or more particular computer resources (e.g., one or more software applications), as explained further below.

According to one embodiment of the present invention, the agent 126 gathers information regarding one or more software applications and any associated components (e.g., active and/or background processes). For example, the agent 126 may determine that the computer 102 includes a LINUX operating system that employs a VERITAS file system, an ORACLE database application, a SYMANTEC NORTON anti-virus product and a MICROSOFT OFFICE suite. The agent 126 may also determine that the SYMANTEC NORTON anti-virus product is a critical and active software application that occasionally scans the computer 102 for threats (e.g., viruses, malware and the like) in the background. As such, the agent 126 stores the gathered information in the profile information 124 (i.e., a software profile).

According to yet another embodiment, the agent 126 gathers information regarding the configurations of one or more peripheral devices (e.g., data storage devices, communication network devices and the like) and/or internal hardware devices (e.g., computer memory devices, processors and the like). For example, the agent 126 may determine that the computer 102 includes a WESTERN DIGITAL hard disk drive with a capacity of ten gigabytes, a double data rate dual synchronous dynamic random access memory (SDRAM) device with a bandwidth of one gigabit per second (Gb/s), a processor with a clock frequency of 2.5 gigahertz, and a network gateway built on the Institute of Electrical and Electronics Engineers (IEEE) 802.11g standard with a bandwidth capacity of 54 Megabits per second (Mbps). Furthermore, the DDR2 SDRAM device comprises a plurality of modules where each module has a density of two GB. Additionally, each module comprises a plurality of chips where each chip has a capacity of one Gigabit. Accordingly, the agent 126 communicates such determinations to the health module 128 for use in computing system health scores. In one embodiment, the agent 126 communicates such determinations to the server 104 to be stored in the profile information 124.

In another embodiment, the information gathered by the agent 126 further includes statistics pertaining to the utilization, stability and/or performance of the various resources. Notably, such statistics are influenced by the configurations of the various resources. For example, the agent may determine that the computer $102_i$ takes thirty second to boot. The agent 126 may determine that the computer $102_i$ crashes or freezes once a month and experience memory device failures once a week. The agent 126 may also determine that the DDR2 SDRAM device installed on the computer 102 has a peak data transfer rate of 6400 Megabytes per second (MB/s) and an average data transfer rate of 5600 MB/s. In addition, the DDR2 SDRAM device achieves a latency of five nanoseconds (ns) for read cycles (e.g., the time between successive read operations to an open row).

The agent 126 may also determine that the network gateway device provides the computer 102 with only 36 Mbps of bandwidth due to a variety of reasons (e.g., network congestion, low signal strength, interference from other radio devices and the like). The agent 126 may also determine that the computer 102 has consumed ninety percent of the available ten gigabytes of storage space on the hard drive disk. Furthermore, the hard disk drive achieves a data access latency of four nanoseconds and an average data transfer rate of 700 Mb/s. Moreover, such statistics may indicate a frequency of bottlenecks at the various resources. For example, input/output bottlenecks at the DDR2 device may cause the computer $102_i$ to crash once a month. Accordingly, bottlenecks influence the system health scores computed by the health module 128.

In another embodiment, the agent 126 determines an amount of the various resources (e.g., memory devices, processors, networking components and the like) being utilized and/or allocated for a particular software application that is executed at the computer $102_i$ during a given point of time. For example, the agent 126 may determine that the SYMANTEC NORTON anti-virus product uses one percent of available processor time or cycles and employs an eleven MB working set (i.e., a number of pages resident in DDR2 SDRAM). As another example, the agent 126 may also determine that the SYMANTEC NORTON anti-virus product increases the utilization of the processor from one percent to two percent of the available processor time during a security scan of the hard disk drive. Accordingly, the agent 126 communicates such determinations to the health module 128 for computing system health scores for the computer $102_i$. In one embodiment, the agent 126 may communicate such determinations to the server 104 to be stored in the profile information 124.

The manager 114 and the health module 128 cooperate to identify optimal configurations for various resources. Moreover, the manager 114 generates the healthy configuration information 116, which comprises relationships between a particular portion of the profile information 124 and healthy/optimal configurations of resources for the particular portion of the profile information 124. Various portions of the profile information 124 associated with the plurality of computers 102 are evaluated by the manager 114. In one embodiment, the manager 114 organizes the plurality of computers 102 based on the profile information 124. For example, the manager 114 identifies one or more computers that have equivalent or substantially similar software profiles (e.g., a similar collection of software applications) and/or hardware configurations. Hence, the manager 114 forms groups of similar computers.

Each group is evaluated using one or more health scoring techniques employed by the health module 128 to compute system health scores for each and every computer in the group. In one embodiment, the manager 114 sorts the computers within each group according to system health scores. The manager 114 identifies and analyzes one or more healthy computers (i.e., computers having above average system health scores) to identify optimal system configurations and/or generate the health configuration information 116. For example, the manager 114 stores the software profile and one or more hardware configurations associated with the one or more healthy computers in the healthy configuration information 116. Thus, the manager 114 is enabled to search the healthy configuration information 116 and extract optimal hardware configurations for another software profile that is similar to the software profile of the one or more healthy computers.

In another embodiment, system health scores for two or more computers within the same group are compared to determine an impact on the system health associated with differences in hardware and/or software configurations at the two or more computers. Accordingly, a difference between the system health scores indicates an impact on the system health associated with the differences in hardware and/or software configurations. For example, the manager 114 compares hardware and/or software configurations at a first computer having a best system health score with hardware and/or software configurations at a second computer having a worst system health score within the same group. Accordingly, the manager 114 determines differences in the hardware and/or software configurations between the first computer and the second computer. The manager 114 evaluates such differences to identify the optimal configurations for a similar portion of the profile information 124 associated with the first computer and the second computer (i.e., similar software and/or hardware profile for the same group). In one embodiment, the manager 114 determines recommendations as to one or more hardware and/or software configuration changes that will improve the system health at the second computer.

For example, the manager 114 may determine that an increase of four GB of RAM (e.g., DDR2 SDRAM) from four gigabytes to eight gigabytes corresponds with a sixty percent improvement in performance of the computer $102_i$. Moreover, each additional four gigabytes in RAM results in a 10-15% improvement in performance. After 16 gigabytes of RAM, the computer 102 experiences little or no improvement in performance. Hence, any amount of additional RAM after 16 GB does not impact the health of the computer $102_i$.

Consequently, a system administrator may decide to add additional RAM to the computer 102 based on the health configuration information 116.

According to another embodiment of the present invention, the manager 114 evaluates a first health score of a first computer (e.g., the computer 102) with a second health score of a second computer where the second computer is similar to the first computer. The second computer is similar to the first computer if both computers comprise essentially the same resources (e.g., software applications and hardware devices) as denoted by the profile information 124. A portion of the profile information associated with the first computer and the second computer indicates equivalent or similar configurations of the resources. Hence, optimal configurations for the resources at the first computer may be applied to the second computer to achieve an improvement in overall system health. In one embodiment, the manager 114 extracts the optimal configurations for the first computer or the second computer from the healthy configuration information 116.

According to one embodiment, the manager 114 identifies two or more computers having similar software profiles and clusters the computers by system health scores. Then, the manager 114 compares hardware configurations at a computer having a best system health score with hardware configurations at a computer having a worst system health score to identify the differences in hardware configurations. The manager 114 formulates recommendations for hardware changes based on the comparison.

In another embodiment, the manager 114 identifies two or more computers having similar hardware profiles (e.g., similar hardware configurations) and clusters the computers by system health scores. Then, the manager 114 compares software configurations at a computer having a best system health score with software configurations at a computer having a worst system health score to identify the differences in software configurations. The manager 114 formulates recommendations for software changes based on the comparison.

In one embodiment, the software profile comprises operating system settings and a number of installed software applications. The manager 114 compares two computers that have a same set of installed software applications to identify differences in the operating system and the operating system settings. In another embodiment, the manager 114 compares two computers that have same operating system and operating system settings to identify a software application to uninstall or install. The manager 114 may perform the comparison in an iterative fashion to increase the system health of a computer one software application at a time.

In one embodiment, the manager 114 compares a portion of the profile information 124 associated with the computer $102_i$ with the healthy configuration information 116 to identify an optimal configuration of the various resources at the computer $102_i$. For example, the manager 114 searches the healthy configuration information 116 to identify one or more computers having profile information that is similar or equivalent to the portion of the profile information 124. Based on system health scores for the one or more computers, the manager 114 determines hardware and/or software configurations modifications to the computer $102_i$ for improving the system health.

Alternatively, the profile information 124 indicates a number of enterprise applications associated with the various resources (e.g., a server cluster, such as an ORACLE server cluster). In this embodiment, the health module 128 determines a health score for a system of nodes (e.g., computers) to represent an overall health of the server cluster. Consequently, a configuration of a resource associated with an enterprise application may refer to a configuration of one or more nodes of the server cluster. The manager 114 processes the profile information 124 and the system health scores associated with the server cluster to identify an optimal configuration of the one or more nodes. In one embodiment, the manager 114 compares two or more health scores to determine an impact on the health of the server cluster that is associated with the number of enterprise applications. In yet another embodiment, the manager 114 determines an impact on the health of the server cluster associated with a modification to the configuration of the one or more nodes.

In another alternative embodiment, the manager 114 forms groups comprising one or more nodes from a plurality of nodes where the one or more nodes have similar or equivalent profiles (e.g., software and/or hardware profiles). The one or more nodes are clustered and sorted based on system health scores. Hardware and/or software configurations at a first node having a best system health score are used to identify an optimal configuration for a second node in the same group (i.e., same cluster). Therefore, the system health of the cluster is improved once the optimal configuration is employed at the second node.

Figure 2:
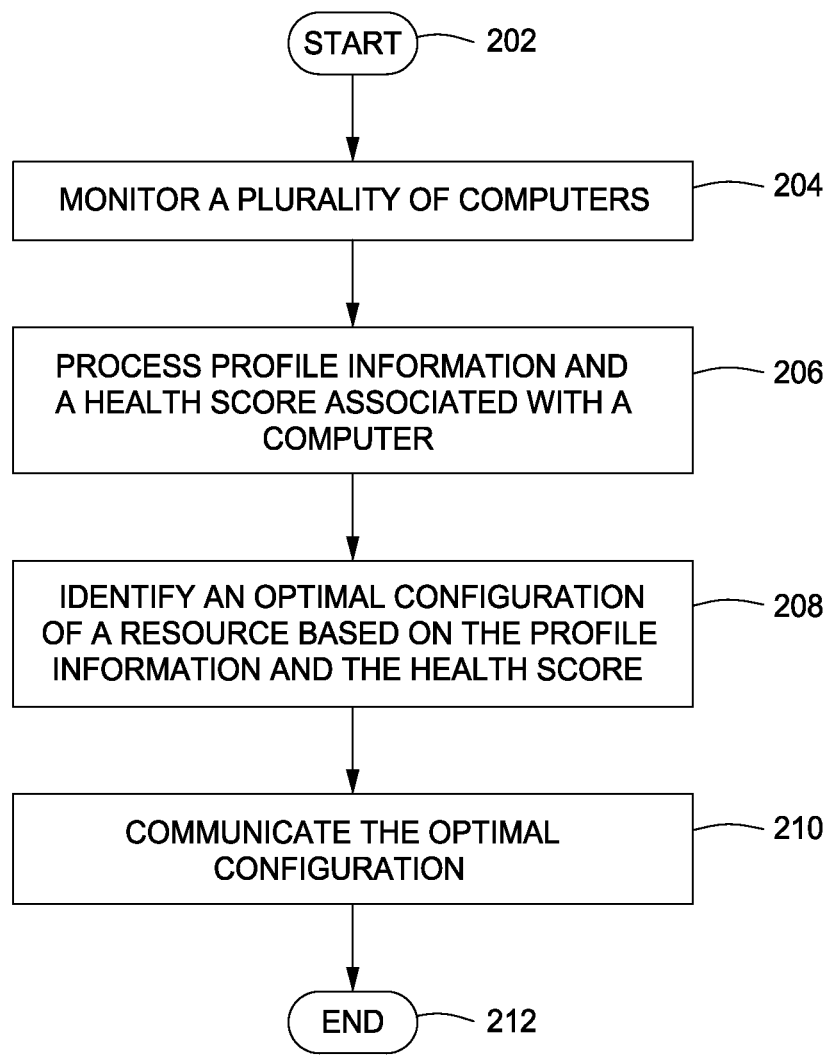
FIG. 2 depicts a flow diagram of a method for identifying an optimal configuration of a resource, according to one embodiment of the present invention.

FIG. 2 depicts a method 200 for identifying an optimal configuration of a computer resource, according to one embodiment of the present invention. The method 200 begins at step 202 and proceeds to step 204.

At step 204, a plurality of computers (e.g., the plurality of computers 102 of FIG. 1) are monitored by a server (e.g., the server 104 of FIG. 1). An agent (e.g., the agent 126 of FIG. 1) collects various information regarding utilizations and configurations of various resources associated with a computer of the plurality of computers. Furthermore, the information collected by the agent is used to generate hardware and/or software profiles (e.g., the profile information 124 of FIG. 1) for the computer.

A health module (e.g., the health module 128 of FIG. 1) computes a system health score for each computer in the plurality of computer. The health score represents an overall health of the computer with respect to stability and performance of the various resources. At step 206, the profile information and the health score associated with the each computer is processed. According to yet another embodiment of the present invention, the step 206 has been further described in method 300 by a sequence of steps starting from step 312 and proceeding to step 318. In addition, the step 204 has been further described in the method 300 by a sequence of steps starting from step 304 to step 310.

At step 208, an optimal configuration of a resource based on the profile information and the health scores is identified. In one embodiment, a manager (e.g., the manager 114 of FIG. 1) recommends hardware and/or software configurations changes based on a difference in system health scores between two or more computers of the plurality of computers. At step 210, the optimal configuration of the resource is communicated to a system administrator. At step 212, the method 200 ends.

Figure 3:
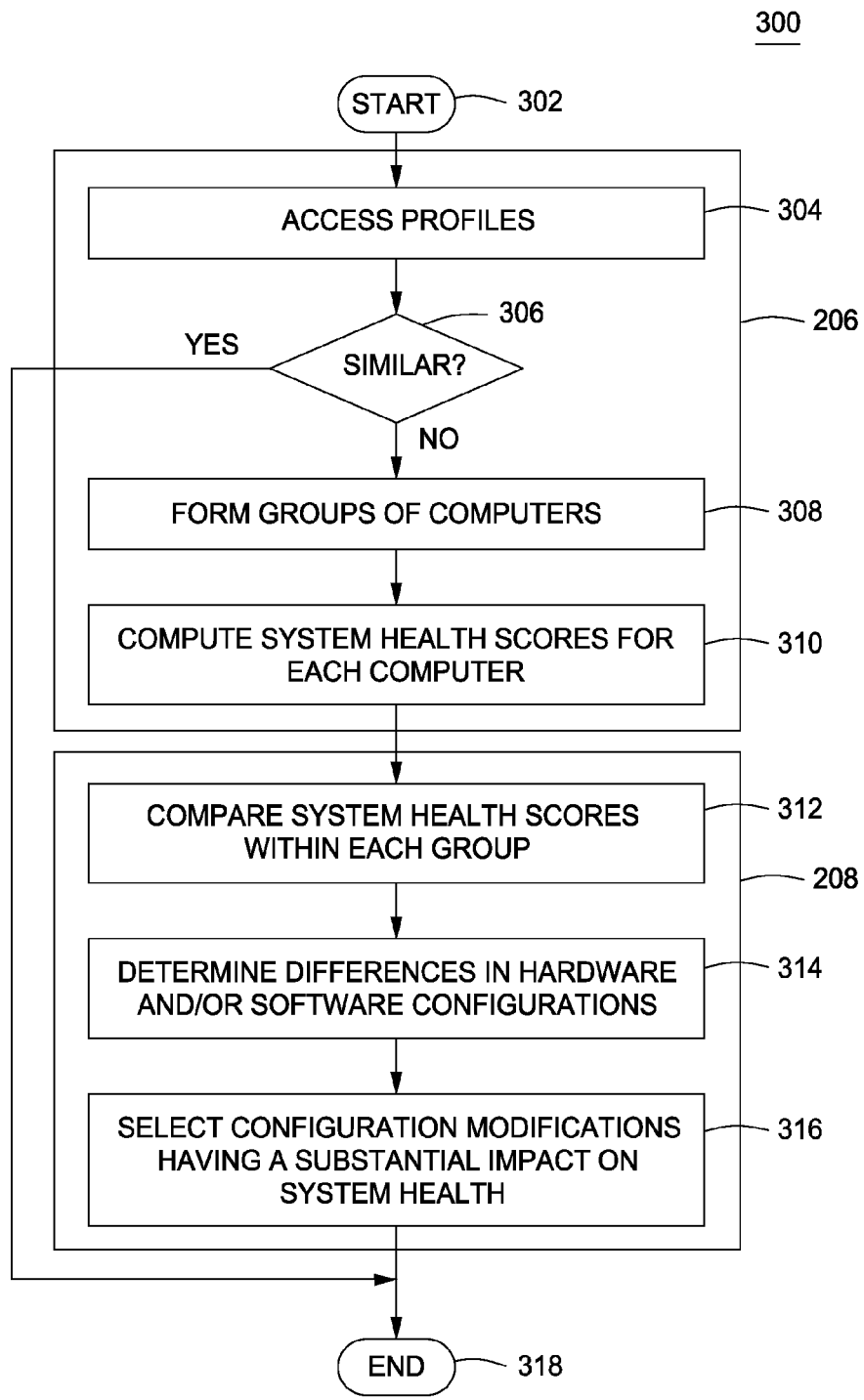
FIG. 3 depicts a flow diagram of a method for comparing two health scores to determine an impact on a health of a computer, according to one embodiment of the present invention.

FIG. 3 depicts a method 300 for comparing system health scores to determine an impact on a system health of a computer associated with a modification to a hardware and/or software configuration at the computer, according to one embodiment of the present invention. The method 300 begins at step 302 and proceeds to step 304.

At step 304, profiles (e.g., hardware profiles and/or software profiles) associated with a plurality of computers are accessed. At step 306, a determination is made as to whether any of the profiles are similar. If there are no similar profiles, then the method 300 proceeds to step 318. If there are similar profiles, then the method 300 proceeds to step 308. At step 308, groups of one or more computers having similar profiles are formed. In one embodiment, one or more computers having a similar software profile (e.g., similar installed software applications) are grouped together. In another embodiment, one or more computer having a similar hardware profile. At step 310, system health scores are computed for each computer in each group.

At step 312, the system health scores within each group are compared. At step 314, differences in hardware and/or software configurations are determined. In one embodiment, an impact on the system health is indicated by a difference between two or more system heath scores for two or more computers within the same group. As such, the impact is related to (e.g., caused by) the differences in hardware and/or software configurations. At step 316, hardware and/or software configuration modifications having a substantial impact on system health are selected. Such modifications are recommended to an administrator or owner of the computer. At step 318, the method 300 ends.

While the foregoing is directed to embodiments of the present invention, other and further embodiments of the invention may be devised without departing from the basic scope thereof, and the scope thereof is determined by the claims that follow.

What is claimed is:

1. A method of using a health scoring technique to improve a health of a computer, comprising:
   processing profile information and a first health score using a computer, wherein the profile information and the first health score are associated with a computer having a resource, wherein the profile information indicates an installed software and a hardware configuration, wherein the health score represents a health of the computer, and wherein the health of the computer is determined from one or more performance metrics;
   identifying a group of computers having a similar profile from a plurality of computers, wherein two or more computers have a similar profile if they share a threshold percentage of one of installed software applications and installed hardware devices; and
   identifying an optimal configuration of the resource from among a set of health configuration information using a computer based on the profile information and the health score by comparing the first health score with a second health score for a computer identified from among the group of computers and where the health configuration information comprises a set of data identifying hardware and software configurations and one or more health scores associated with the plurality of computers.

2. The method of claim 1 further comprising evaluating information regarding at least one resource coupled with the computer to determine a health score.

3. The method of claim 1, wherein processing the profile information and the health score further comprises:
   identifying at least two computers having similar profile information;
   forming a group comprising the at least two computers; and
   comparing at least two health scores associated with the at least two computers.

4. The method of claim 3, wherein identifying the optimal configuration further comprises:
   determining differences in configurations at the at least two computers; and
   selecting a modification to a configuration at a computer of the at least two computers having an impact on a health of the computer.

5. The method of claim 3, wherein identifying the optimal configuration further comprises:
   sorting the at least two computers based on the at least two health scores; and
   identifying a configuration at a computer of the at least two computers having a best health score.

6. The method of claim 3, wherein identifying the optimal configuration further comprises:
   sorting the at least two computers based on the at least two health scores;
   comparing configurations at a first computer having a best health score with configurations at a second computer having a worst health score; and
   determining a configuration to improve a health of the second computer based on the comparison.

7. The method of claim 3, wherein identifying the optimal configuration further comprises:
   sorting the at least two computers based on the at least two health scores;
   identifying at least one healthy computer of the at least two computers; and
   generating healthy configuration information using a configuration at the at least one healthy computer, wherein the healthy configuration information indicates a relationship between the configuration and the similar profile information associated with the at least two computers.

8. The method of claim 3, wherein identifying the optimal configuration further comprises:
   comparing healthy configuration information with the profile information associated with the computer; and
   identifying a healthy configuration related to profile information that is similar to the profile information associated with the computer.

9. The method of claim 1 further comprising computing a health score based on at least one of a stability measurement or a performance measurement.

10. An apparatus for using a health scoring technique to improve a health of a computer, comprising:
   a manager for processing profile information and a health score associated with a computer to generate healthy configuration information, wherein the profile information indicates a number of software applications and a configuration of a resource, wherein the health score represents a health of the computer and identifying an optimal configuration of the resource based on the profile information and the health score, and wherein the health of the computer is determined from one or more performance metrics, and wherein the manager identifies a group of computers having a similar profile from a plurality of computers, wherein two or more computers have a similar profile if they share a threshold percentage of one of installed software applications and installed hardware devices, and wherein the manager determines a difference in configurations at a first computer of the group of computers having a best health score and configurations at a second computer of the group of computers having a worst health score, wherein the difference in configurations is associated with a difference between the best health score and the worst health score; and
   a memory comprising the healthy health configuration information, wherein the healthy health configuration information indicates a relationship between the profile information and the optimal configuration of the resource.

11. The apparatus of claim 10 further comprising a health module for computing the first health score based on at least one of a stability measurement or a performance measurement.

12. The apparatus of claim 10 further comprising an agent for collecting information regarding the number of software application and the configuration of the resource.

13. The apparatus of claim 10, wherein the manager searches the healthy configuration information for a healthy configuration having a relationship with profile information that is similar to the profile information associated with the computer.

14. The apparatus of claim 10, wherein the manager identifies the optimal configuration based on a computed difference between at least two health scores.

15. A system for using a health scoring technique to improve a health of a plurality of nodes, comprising:
a plurality of nodes, wherein at least one node is associated with profile information and a health score, wherein the profile information indicates a number of software applications and a configuration of at least one resource associated with the at least one node, wherein the health score represents a health of the at least one node, and wherein the health of the computer is determined from one or more performance metrics; and
a server for monitoring the plurality of nodes, comprising:
a manager for processing the profile information and the health score from the at least one node to identify an optimal configuration of the at least one resource and to generate healthy configuration information, wherein the healthy configuration information indicates a relationship between the profile information and the optimal configuration of the at least one resource and wherein the manager identifies a group of server clusters having a similar profile from a plurality of server clusters, wherein two or more computers have a similar profile if they share a threshold percentage of one of installed software applications and installed hardware devices, wherein each server cluster comprises at least one node of the plurality of nodes, and wherein the manager determines a difference in configurations at a first server cluster having a best health score and configurations at a second server cluster having a worst health score wherein the difference in configurations is associated with a difference between the best health score and the worst health score.

16. The system of claim 15, wherein the at least one node form a portion of a server cluster and the manager identifies an optimal configuration for the server cluster.

17. The system of claim 15, wherein the manager compares profile information associated with a first cluster comprising at least one node with the healthy configuration information to identify the optimal configuration for the first cluster.

18. The system of claim 15, wherein the manager identifies an optimal configuration for a resource of the at least one resource based on an impact on a health of a node associated with different configurations of the resource.

* * * * *